(12) United States Patent
Gunaratne et al.

(10) Patent No.: US 10,884,815 B2
(45) Date of Patent: Jan. 5, 2021

(54) INDEPENDENT SERVICES PLATFORM

(71) Applicant: Pivotal Software, Inc., San Francisco, CA (US)

(72) Inventors: Rajasinghe Saman Gunaratne, London (GB); Jatin Suryakiran Naik, London (GB); Matthew McNeeney, Surbiton (GB); Matthew O'Donnell, London (GB); Edward James Gordon King, London (GB)

(73) Assignee: Pivotal Software, Inc., San Francisco, CA (US)

( * ) Notice: Subject to any disclaimer, the term of this patent is extended or adjusted under 35 U.S.C. 154(b) by 3 days.

(21) Appl. No.: 16/173,639

(22) Filed: Oct. 29, 2018

(65) Prior Publication Data
US 2020/0133737 A1 Apr. 30, 2020

(51) Int. Cl.
*G06F 9/50* (2006.01)
*G06F 9/455* (2018.01)
(Continued)

(52) U.S. Cl.
CPC ........ *G06F 9/5072* (2013.01); *G06F 9/45558* (2013.01); *G06F 9/5077* (2013.01);
(Continued)

(58) Field of Classification Search
CPC .................................................. H04L 41/5054
(Continued)

(56) References Cited

U.S. PATENT DOCUMENTS

| 6,266,809 B1 | 7/2001 | Craig et al. |
| 6,367,073 B2 | 4/2002 | Elledge |
| (Continued) | | |

FOREIGN PATENT DOCUMENTS

| EP | 2 299 360 | 3/2011 |
| EP | 2 381 363 | 10/2011 |
| JP | 2007/507046 | 3/2007 |

OTHER PUBLICATIONS

Armbrust et al., "A view of cloud computing," 2010 ACM, pp. 50-58; <http://dl.acm.org/citation.cfm?id=1721672>.
(Continued)

*Primary Examiner* — Sm A Rahman
*Assistant Examiner* — Emad Siddiqi
(74) *Attorney, Agent, or Firm* — Fish & Richardson P.C.

(57) ABSTRACT

Methods, systems, and apparatus, including computer programs encoded on computer storage media, for implementing an independent services platform. One of the methods includes maintaining a first software platform system configured to host user-provided computing tasks in a cloud computing environment of a distributed computing system. A services platform system configured to host services in the cloud computing environment of the distributed computing system is also maintained, wherein the second services platform system is configured to provision independent service resources in the underlying cloud computing infrastructure, and launch one or more service instances of the service using the provisioned independent service resources in the underlying cloud computing infrastructure. The second services platform system is configured to receive a bind request from a user and to provide binding information to one or more computing tasks hosted by the first software platform system upon receiving the bind request.

22 Claims, 4 Drawing Sheets

(51) Int. Cl.
*H04L 12/24* (2006.01)
*H04L 12/911* (2013.01)
*H04L 29/08* (2006.01)

(52) U.S. Cl.
CPC ...... *H04L 41/5054* (2013.01); *H04L 41/5096* (2013.01); *H04L 47/70* (2013.01); *G06F 2009/45562* (2013.01); *G06F 2009/45583* (2013.01); *G06F 2009/45587* (2013.01); *H04L 67/10* (2013.01)

(58) Field of Classification Search
USPC ........................................................ 709/226
See application file for complete search history.

(56) References Cited

U.S. PATENT DOCUMENTS

| | | |
|---|---|---|
| 6,609,128 B1 | 8/2003 | Underwood |
| 6,976,093 B2 | 12/2005 | Lara et al. |
| 7,024,668 B2 | 4/2006 | Shiomi et al. |
| 7,275,244 B1 | 9/2007 | Bell et al. |
| 7,356,679 B1 | 4/2008 | Le et al. |
| 7,370,322 B1 | 5/2008 | Matena et al. |
| 7,533,381 B2 | 5/2009 | Ando |
| 7,577,722 B1 | 8/2009 | Khandekar |
| 7,634,488 B2 | 12/2009 | Keys et al. |
| 7,788,662 B2 | 8/2010 | Haselden et al. |
| 7,849,460 B1 | 12/2010 | Martin |
| 7,874,008 B2 | 1/2011 | Chang et al. |
| 7,971,059 B2 | 6/2011 | Calman et al. |
| 8,091,084 B1 | 1/2012 | Dobrovokskiy et al. |
| 8,108,855 B2 | 1/2012 | Dias |
| 8,108,912 B2 | 1/2012 | Ferris |
| 8,176,094 B2 | 5/2012 | Friedman |
| 8,176,559 B2 | 5/2012 | Mathur et al. |
| 8,201,237 B1 | 6/2012 | Doane et al. |
| 8,225,093 B2 | 7/2012 | Fok et al. |
| 8,281,307 B2 | 10/2012 | Arnold |
| 8,327,357 B2 | 12/2012 | Amsden |
| 8,359,594 B1 | 1/2013 | Davidson et al. |
| 8,375,360 B2 * | 2/2013 | I'Anson ............ H04L 41/5054 717/120 |
| 8,407,689 B2 | 3/2013 | Dournov et al. |
| 8,417,798 B2 | 4/2013 | Chen |
| 8,429,630 B2 | 4/2013 | Nickolov et al. |
| 8,490,082 B2 | 7/2013 | Moore et al. |
| 8,495,611 B2 | 7/2013 | McCarthy |
| 8,538,921 B2 | 9/2013 | Hall |
| 8,578,375 B2 | 11/2013 | Pagan et al. |
| 8,584,119 B2 | 11/2013 | Ellington et al. |
| 8,601,226 B1 | 12/2013 | Lappas et al. |
| 8,627,310 B2 | 1/2014 | Ashok et al. |
| 8,682,957 B2 | 3/2014 | Elson et al. |
| 8,793,348 B2 | 7/2014 | Ott |
| 8,799,298 B2 | 8/2014 | Weissman |
| 8,839,221 B2 | 9/2014 | Sapuntzakis et al. |
| 8,997,078 B2 | 3/2015 | Spivak et al. |
| 9,015,710 B2 | 4/2015 | Spivak et al. |
| 9,043,767 B2 | 5/2015 | Spivak et al. |
| 10,187,323 B2 | 1/2019 | Laplanche |
| 2002/0174421 A1 | 11/2002 | Zhao et al. |
| 2002/0178254 A1 | 11/2002 | Brittenham et al. |
| 2003/0061247 A1 | 3/2003 | Renaud |
| 2004/0030710 A1 | 2/2004 | Shadle |
| 2004/0183831 A1 | 9/2004 | Ritchy et al. |
| 2005/0022198 A1 | 1/2005 | Olapurath et al. |
| 2005/0120332 A1 | 6/2005 | Martin |
| 2005/0120347 A1 | 6/2005 | Asare |
| 2005/0198303 A1 | 9/2005 | Knauerhase et al. |
| 2005/0257206 A1 | 11/2005 | Semerdzhiev |
| 2005/0278518 A1 | 12/2005 | Ko et al. |
| 2005/0289536 A1 | 12/2005 | Nayak et al. |
| 2006/0010176 A1 | 1/2006 | Armington |
| 2006/0026585 A1 | 2/2006 | Haselden et al. |
| 2006/0037071 A1 | 2/2006 | Rao et al. |
| 2006/0079356 A1 | 4/2006 | Kodama et al. |
| 2006/0136701 A1 | 6/2006 | Dickinson |
| 2006/0136897 A1 | 6/2006 | Laxminarayan et al. |
| 2006/0248522 A1 | 11/2006 | Lakshminarayanan et al. |
| 2007/0058548 A1 | 3/2007 | Babonneau et al. |
| 2007/0168956 A1 | 7/2007 | Moore et al. |
| 2007/0204262 A1 | 8/2007 | Ahluwalia et al. |
| 2007/0209035 A1 | 9/2007 | Sonderegger et al. |
| 2007/0250513 A1 | 10/2007 | Hall |
| 2008/0109788 A1 | 5/2008 | Prieto |
| 2008/0127175 A1 | 5/2008 | Naranjo |
| 2008/0163171 A1 | 7/2008 | Chess et al. |
| 2008/0163194 A1 | 7/2008 | Dias |
| 2008/0209016 A1 | 8/2008 | Karve et al. |
| 2008/0244577 A1 | 10/2008 | Le et al. |
| 2008/0307414 A1 | 12/2008 | Alpern et al. |
| 2009/0049102 A1 | 2/2009 | Weissman |
| 2009/0070752 A1 | 3/2009 | Alpern et al. |
| 2009/0070853 A1 | 3/2009 | Chung et al. |
| 2009/0100420 A1 | 4/2009 | Sapuntzakis et al. |
| 2009/0112919 A1 | 4/2009 | De Spiegeleer |
| 2009/0172781 A1 | 7/2009 | Masuoka et al. |
| 2009/0187995 A1 | 7/2009 | Lopatic et al. |
| 2009/0216970 A1 | 8/2009 | Basler et al. |
| 2009/0276771 A1 | 11/2009 | Nickolov |
| 2009/0320012 A1 | 12/2009 | Lee et al. |
| 2009/0320019 A1 | 12/2009 | Ellington et al. |
| 2010/0103837 A1 | 4/2010 | Jungck et al. |
| 2010/0131590 A1 | 5/2010 | Coleman et al. |
| 2010/0142447 A1 | 6/2010 | Schlicht et al. |
| 2010/0146425 A1 | 6/2010 | Lance et al. |
| 2010/0251328 A1 | 9/2010 | Syed et al. |
| 2010/0257605 A1 | 10/2010 | McLaughlin et al. |
| 2010/0281166 A1 | 11/2010 | Buyya et al. |
| 2010/0318649 A1 | 12/2010 | Moore et al. |
| 2010/0325624 A1 | 12/2010 | Bartolo et al. |
| 2010/0333085 A1 | 12/2010 | Criddle et al. |
| 2011/0004916 A1 | 1/2011 | Schiffman et al. |
| 2011/0029947 A1 | 2/2011 | Markovic |
| 2011/0055707 A1 | 3/2011 | Kimmet |
| 2011/0055714 A1 | 3/2011 | Vemulapalli et al. |
| 2011/0055828 A1 | 3/2011 | Amsden |
| 2011/0061046 A1 | 3/2011 | Phillips et al. |
| 2011/0072505 A1 | 3/2011 | Ott |
| 2011/0107411 A1 | 5/2011 | McClain et al. |
| 2011/0126197 A1 | 5/2011 | Larsen et al. |
| 2011/0145790 A1 | 6/2011 | Rajaraman et al. |
| 2011/0145836 A1 | 6/2011 | Wheeler et al. |
| 2011/0153684 A1 | 6/2011 | Yung |
| 2011/0153727 A1 | 6/2011 | Li |
| 2011/0153824 A1 | 6/2011 | Chikando et al. |
| 2011/0167469 A1 | 7/2011 | Letca et al. |
| 2011/0214124 A1 | 9/2011 | Ferris et al. |
| 2011/0231552 A1 | 9/2011 | Carter et al. |
| 2011/0258333 A1 | 10/2011 | Pomerantz et al. |
| 2011/0258619 A1 | 10/2011 | Wookey et al. |
| 2011/0265076 A1 | 10/2011 | Thorat |
| 2011/0265164 A1 * | 10/2011 | Lucovsky ................ G06F 8/61 726/7 |
| 2011/0265168 A1 | 10/2011 | Luckovsky et al. |
| 2011/0276713 A1 | 11/2011 | Brand |
| 2011/0283194 A1 | 11/2011 | Chen et al. |
| 2011/0302569 A1 | 12/2011 | Kunze et al. |
| 2011/0321031 A1 | 12/2011 | Dournov |
| 2012/0030672 A1 * | 2/2012 | Zygmuntowicz ......... G06F 8/60 718/1 |
| 2012/0054731 A1 | 3/2012 | Aravamudan et al. |
| 2012/0066670 A1 | 3/2012 | McCarthy et al. |
| 2012/0072480 A1 | 3/2012 | Hays |
| 2012/0084769 A1 | 4/2012 | Adi et al. |
| 2012/0102480 A1 | 4/2012 | Hopmann |
| 2012/0102481 A1 | 4/2012 | Mani et al. |
| 2012/0159469 A1 | 6/2012 | Laor |
| 2012/0185913 A1 | 7/2012 | Martinez et al. |
| 2012/0240135 A1 | 9/2012 | Risbood et al. |
| 2012/0254850 A1 | 10/2012 | Hido et al. |
| 2012/0266156 A1 * | 10/2012 | Spivak .................... H04L 67/34 717/172 |
| 2012/0266158 A1 | 10/2012 | Spivak et al. |

(56) References Cited

U.S. PATENT DOCUMENTS

| | | |
|---|---|---|
| 2012/0266159 A1 | 10/2012 | Risbood et al. |
| 2012/0266168 A1 | 10/2012 | Spivak et al. |
| 2012/0324116 A1 | 12/2012 | Dorai et al. |
| 2013/0006689 A1 | 1/2013 | Kinnear et al. |
| 2013/0041931 A1 | 2/2013 | Brand |
| 2013/0185715 A1 | 7/2013 | Dunning et al. |
| 2013/0227091 A1 | 8/2013 | Tompkins |
| 2013/0232480 A1 | 9/2013 | Winterfeldt et al. |
| 2014/0040656 A1 | 2/2014 | Ho |
| 2015/0242237 A1 | 8/2015 | Spivak et al. |
| 2015/0317149 A1* | 11/2015 | Cai .................. G06F 9/5072 717/172 |
| 2016/0098262 A1 | 4/2016 | Spivak et al. |
| 2016/0098263 A1 | 4/2016 | Spivak et al. |

OTHER PUBLICATIONS

Blomer et al., "Micro-CernVM: slashing the cost of building and deploying virtual machines," Journal of Physics: Conference Series 513, 2014, 8 pages.

Borja Sotomayor, "Virtual Infrastructure Management in Private and Hybrid Clouds," 2009 IEEE; pp. 14-22; http://ieeexplore.ieee.org/stamp/stamp.jsp?arnumber=5233608.

Ching-Chi Lin, "Energy-Aware Virtual Machine Dynamic Provision and Scheduling for Cloud Computing," 2011 IEEE; pp. 736-737; http://ieeexplore.ieee.org/stamp/stamp.jsp_?arnumber=6008778.

Daniel Nurmi, "The Eucalyptus Open-source Cloud-computing System," 2009 IEEE; pp. 124-131; http://ieeexplore.ieee.org/stamp/stamp.jsp?arnumber=5071863.

European Search Report in EP Application No. 11163533.0, dated Feb. 3, 2012, 10 pages.

Goodwill, "Deploying Web applications to Tomcat," O'Reilly, Apr. 19, 2001, pp. 1-11, XP002646829, Retrieved from the Internet: URL: http://oreilly.com/1pt/a/780 [retrieved on Jun. 30, 2011].

Goodwill, "Java Web Applications," O'Reilly, Mar. 15, 2001, pp. 1-3, XP002646828, Retrieved from the Internet: URL: http://onjava.com/1pt/a/671 [retrieved on Jun. 30, 2011].

Hansen et al., "Scalable Virtual machine storage using local disks", Dec. 2010, 9 pages.

Hansen et al., "Lithium Virtual Machine Storage for the Cloud," 2010 ACM; pp. 15-26; <http://d1.acm.org/citation.cfm?id=1807134>.

International Preliminary Report on Patentability in International Application No. PCT/US2012/033356, dated Oct. 15, 2013, 9 pages.

International Search Report dated Jun. 28, 2012 in counterpart PCT application PCT/US2012/033356, filed Apr. 12, 2012, with written opinion.

Keahey et al., "Virtual workspaces Achieving quality of service and quality of life in the Grid," Scientific Programming, 2005, 13:265-275.

Kecshenneti et al., "An approach for virtual appliance distribution for service deployment," Future Generation Computer Systems, Mar. 2011, pp. 280-289.

Konstantinou et al., "An Architecture for Virtual Solution Composition and Deployment in Infrastructure Clouds," Jun. 2009; ACM; pp. 9-17.

Kubernetes.com [online] "Production-Grade Container Orchestration," year 2019, [retrieved on Mar. 6, 2019], retrieved from: https://kubernetes.io/, 7 pages.

Lagar-Cavilla et al., "SnowFlock Rapid Virtual Machine Cloning for Cloud Computing," ACM, Apr. 2009, pp. 1-12; http://dl.acm.org/citation.cfm?id=1519067 retrieved on Oct. 10, 2018.

Leitner, "Application Level Performance Monitoring of Cloud services," Dec. 2012, vol. 9, pp. 1-8.

Liu et al., "Saas Integration for Software Cloud," 2010 IEEE; pp. 402-409; <http://ieeexplore.ieee.org/stamp/stamp.jsp?tp=&arnumber=5557968>.

Matthews et al., "Virtual Machine Contracts for Datacenter and Cloud Computing Environments," ACM, Jun. 2009, pp. 25-30.

Partial European Search Report for Application No. 11163533.0 dated Jul. 19, 2011, 6 pages.

Pivotal.com [online] "Continuously deliver any app to every major private and public cloud with a single platform," year 2019, [retrieved on Mar. 6, 2019], retrieved from: https://pivotal.io/platform, 20 pages.

Pivotal.com [online] "Enterprise Pivotal Container Service (PKS)," Jan. 22, 2019, [retrieved on Mar. 6, 2019], retrieved from: https://pivotal.io/platform/pivotal-container-service, 14 pages.

Rabbitmq.com [online] "RabbitMQ Best Practices," dated Feb. 15, 2019, [retrieved on Mar. 6, 2019], retrieved from: https://www.rabbitmq.com/, 8 pages.

Razavi et al., "Scalable Virtual Machine Deployment Using VM Image Caches," ACM, Nov. 2013, 12 pages.

Rodrigo N. Calheiros, "Virtual Machine Provisioning Based on Analytical Performance and QoS in Cloud Computing Environments," 2011 IEEE; pp. 295-304; hapiliceexplore.iree.oroistanapistampjsp?arriumber-604719S.

Schmidt et al., "Efficient distribution of virtual machines for cloud computing," 2010 IEEE; pp. 567-574; <http://ieeexplore.ieee.org/stamp/stamp.jsp?tp=&arnumber=5452476>.

Sun et al., "Simplifying Service Deployment with Virtual Appliances," 2008 IEEE International Conference on Services Computing, Jul. 7, 2008, pp. 265-272.

Sushil Bhardwaj, "Cloud Computing: A Study of Infrastructure as a Service (IAAS)," 2010 IJET; pp. 60-63; http://s3.amazonaws.com/academia.edu.documents/7299777/cloud%20computing%20a%20study%20of.pdf.

Tharam Dillon, "Cloud Computing Issues and Challenges," 2010 IEEE; pp. 27-33; http://ieeexplore.ieee.org/stamp/stamp.jsp_?arnu_mber=54_7_467_4.

Thomas, "Enabling Application Agility—Software as a Service, Cloud Computing and Dynamic Languages," 2008 JOT; pp. 29-32; <http://www.jot.fm/issues/issue_2008_05/column3.pdf>.

Tonon, "Tomcat Architecture Diagram," Apr. 26, 2011, p. 1, XP002fi4fi830, retrieved from internet: URL: http://marakana.com/forums/tomcat/general/106.html [retrieved on Jul. 1, 2011].

Wei et al., "Managing security of virtual machine images in a cloud environment," Nov. 13, 2009, 6 pages.

White page of BMC software, "Virtualization management with BMC and VMware," ©2011 BMC software, 2 pages.

International Search Report and Written Opinion in International Appin. No. PCT/US2019/054980, dated Mar. 27, 2020, 13 pages.

* cited by examiner

INDEPENDENT SERVICES PLATFORM

BACKGROUND

This specification relates to cloud computing platforms, and more particularly to integrated application platforms.

A cloud application platform is platform-as-a-service ("PaaS") cloud computing system that allows users to deploy and manage multiple instances of network-accessible applications, which for brevity will also be referred to as simply applications or, when additional context is required, platform applications. The applications are executed by hardware of an underlying cloud computing infrastructure, which may or may not be provided by a different entity, e.g., an entity providing an infrastructure-as-a-service ("IaaS") platform. The cloud application platform can handle provisioning of resources in the underlying cloud computing infrastructure as well as staging and launching of applications using the provisioned resources. Therefore, developers who use the cloud application platform need not spend time building or configuring the hardware of a cloud computing system. Rather, the developers can focus on the application development itself, and rely on the services provided by the cloud application platform to launch and manage instances of the application. After being launched, the application instances can be used by end users over a network, e.g., the Internet.

Some cloud application platforms provide integrated services. A service is a software subsystem that can provide one or more functionalities for use by platform applications. An example of a service for use by a platform application is a database management system that maintains a database that can be accessed and modified by platform applications.

To provide a service, a cloud application platform can launch one or more service instances, which are software modules that implement the functionality of the service. A cloud application platform can automatically provision resources for executing service instances. This collection of resources may be referred to as a services back-end, which can either be pre-provisioned or provisioned on demand. Techniques for on-demand service provisioning are described in commonly-owned U.S. patent application Ser. No. 15/256,275, filed on Sep. 2, 2016, entitled, "On-Demand Resource Provisioning," which is herein incorporated by reference.

A service can be integrated into a cloud application platform by implementing a service application programming interface (API). One example of a service API is the Open Service Broker API. A service API can be used by a controller of the cloud application platform to surface available services for selection by application developers. For example, the cloud application platform can present to application developers a collection of available integrated services that can be used with their platform applications. Such a collection of available integrated services that can be used by platform applications can also be referred to as a services marketplace. A services marketplace is thus a mechanism, an interface, or a tool of the cloud application platform that allows application developers to self-select services to be bound to their platform applications. A services marketplace does not necessarily imply a financial exchange, although some services marketplaces can require payment by application developers in order for the application developers to use a service with their platform applications.

A cloud application platform can bind a service instance to an application by providing to the application the information necessary for the application to use the service instance. This information typically includes at least a location or identifier of a service or an executing service instance, e.g., a network address, and may also include credentials required to access and use the service or service instance.

In order to expose available services to developers, some cloud application platforms use service brokers. A service broker is a component or a module of a service the implements the service API. Service brokers can thus receive and interpret calls to create, update, and delete service instances, and create and delete service bindings. A service broker can be a separate module or another application running on the platform.

There are several different roles involved in implementing integrated services on a cloud application platform. In this specification, a platform operator is an entity that deploys and maintains a cloud application platform. An application developer is an entity that submits an application to the cloud application platform to be staged and executed in one or more application instances. And a service developer is an entity that submits a service to the cloud application platform to be used by platform applications upon being selected by application developers. Lastly, an end user is an entity that uses a deployed platform application that makes use of an integrated service. In this context, an entity serving in of these roles can be any appropriate person or organization as the context requires, e.g., a single developer, a team of developers, developers in an enterprise, or developers who contribute software to a code base. Thus, typically, the service developers are separate from both the platform operators and the application developers. However, in some cases these roles can overlap.

Cloud computing platforms that provide integrated services in this way face a number of different scalability, flexibility, and performance problems that can inhibit adoption of cloud application platforms.

First, because integrated services are specific to the cloud application platform on which they are deployed, the services must be reinstalled every time a cloud application platform is installed. This problem may be referred to as the "many marketplaces problem," meaning that platform operators have to curate and manage many marketplaces across many cloud application platforms. This requires duplicated effort, and presents further challenges, including how the services should be deployed and managed when the platform operator wants them to be consumed from many marketplaces. it is common for different teams within an enterprise to each have separate respective cloud application platforms. And for each cloud application platform that is installed by platform operators of the enterprise, the platform operators have to reinstall every maintained service for every maintained cloud application platform. The problem is even worse on other types of platforms. One example is a container orchestration platform that automatically provisions and manages clusters of high-availability container workloads. Platforms that can launch multiple clusters of container workloads may by default install a separate services marketplace for every cluster of container workloads. This presents challenges of its own, including problems relating to how the services should be deployed and managed.

The problem becomes exacerbated for operators of systems that would like to support shared services between multiple, possibly heterogeneous, software platforms. For example, there are situations in which it would be desirable for a service to be accessible by a container workload running on a container orchestration platform as well as an application running on a cloud application platform. However, such services may not be available to be accessed by container workloads on the second type of software platform. In addition, there are other logical problems that need to be solved by the entities, e.g., jointly deciding on which of the platforms the service instances will be installed and which team will maintain the services.

Even on platforms where such shared services are possible, service performance can degrade when multiple applications are competing for the same resources provisioned in a services back-end. The reason for the performance degradation may not be clear to application developer, the platform operator, or to end users. This is because each user of a platform may not be aware of the service instance usage from another platform.

Lastly, application developers, platform operators, and service developers suffer from having little or no ability to monitor integrated services. While the self-service mechanisms of services marketplaces are convenient, they inhibit these entities from knowing how the services are being used across environments and can inhibit application developers from knowing why their service instances are malfunctioning or crashing.

SUMMARY

This specification describes a cloud computing platform system that allows users to create services in an independent services platform. The independent services platform effectively elevates services to being first-class objects in the system, along with platform applications and container orchestration clusters.

Particular embodiments of the subject matter described in this specification can be implemented to realize one or more of the following advantages. An independent services platform provides an unconventional system architecture for implementing software platform services. An independent services platform provides the ability for a user to bind software tasks, e.g., applications or containers, to services across multiple heterogeneous software platforms using only a few commands that are simple enough to be issued on the command line. This facilitates the ability to share service instances across the different platforms by issuing different bindings of the same service instance to different platforms. The independent services platform also provides the ability for services to be consumed without the existence of a software platform, e.g., by a simple shell script. The independent services platform also provides an efficient mechanism for monitoring services that are being used by a system. Rather than querying multiple different software platforms for all the services that are bound and being used, the system can simply maintain a mapping of such information in the independent services platform. In addition, the independent services platform can provide hardware isolation between the service instances and the software tasks that consume the services. This improves performance of the system as a whole and makes debugging problems easier because it becomes much clearer which component is causing the performance degradations. Allowing the platform operator a single location to configure rules that determine which services the application developers can view and create, as well as to which platforms they are allowed to add their bind credentials. An independent services platform also solves the many marketplaces problem for platform operators. In other words, services do not have to be installed and maintained every single software platform or container cluster maintained by an enterprise. This allows all the services offered by an enterprise to be maintained by a small team of service operators.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

This specification describes technologies that provide for an independent services platform. In this context, being independent means that service instances can be launched on the services platform without requiring the intervention of, or even the existence of, a cloud application platform or another software platform that can consume such services. Being independent can, but need not, also mean that the computing resources provisioned to implement the service instances have hardware isolation from computing resources used for applications or container workloads that consume the services.

A services platform being independent also means that requests to create, update, and delete service instances, and requests to create and delete service bindings, can be provided directly to the services platform without being handled by or routed through another software platform that hosts computing tasks that consume the services. This arrangement is effectively an inversion of control relative to conventional techniques because requests to bind services to computing tasks originate in the platform that is hosting the services and flow to the platform hosting the consuming computing tasks.

Figure 1:
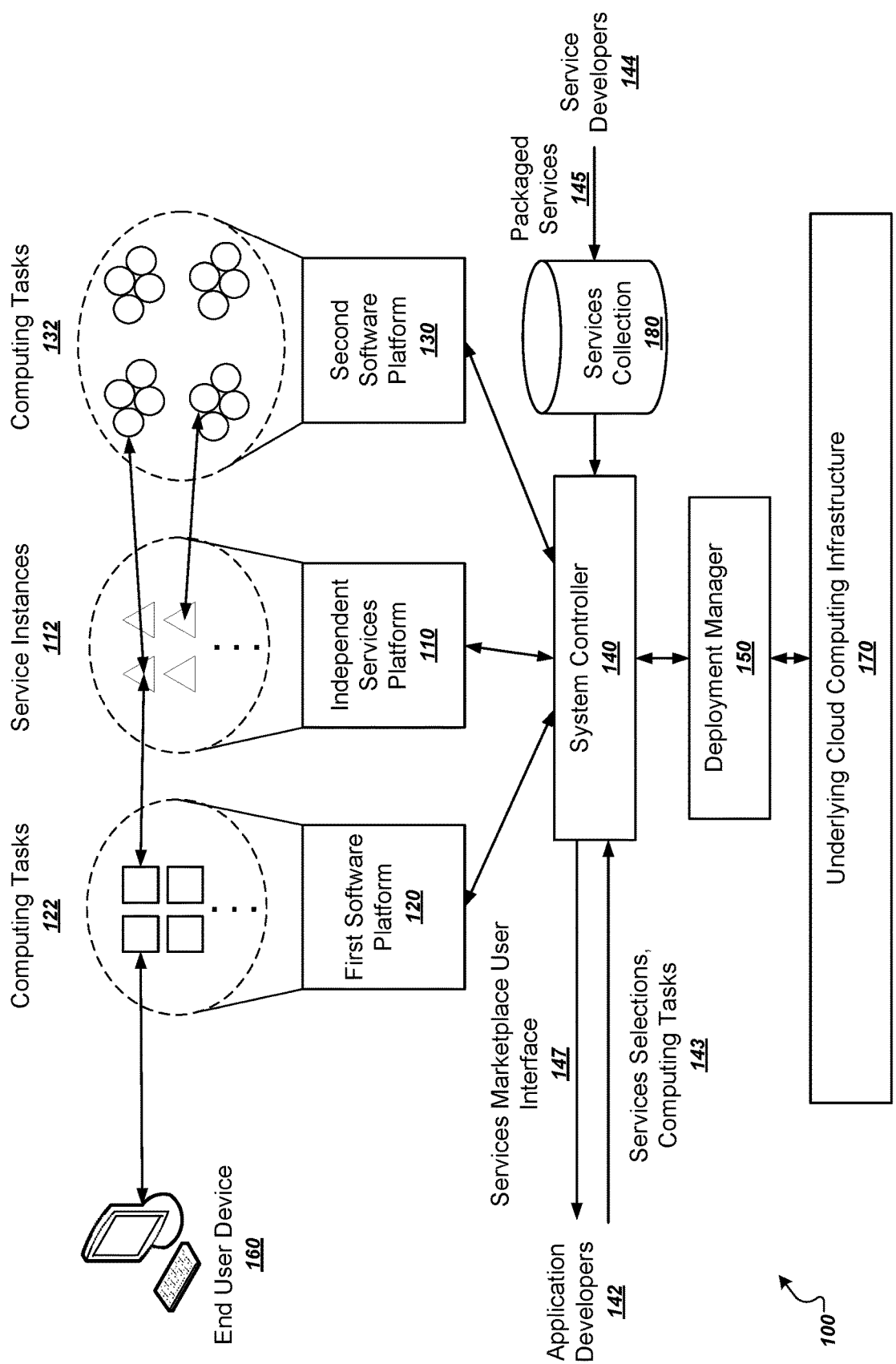
FIG. 1 illustrates an example system having an independent services platform.

FIG. 1 illustrates an example system 100 having an independent services platform 110. The independent services platform 110 hosts service instances 112 that can be consumed by computing tasks hosted on two different software platforms 120 and 130.

A system controller 140 is a software system that coordinates the setup and management of the three platform systems 110, 120, and 130. To do so, the system controller 140 makes use of a deployment manager 150 that can provision appropriate resources in an underlying cloud computing infrastructure 170. For example, the deployment manager 150 can be implemented using the open source BOSH project.

The system 100 can be set up and configured by operators of an entity that maintains the system 100. These can include platform operators that maintain the first software platform 120, platform operators that maintain the second software platform 130, and service operators that maintain the independent services platform 110. Although the system 100 is illustrated as having both a first software platform 120 and a second software platform 130, neither software platform is required in order for service operators to set up the independent services platform 110 or for users to make use of the independent services platform 110. In addition, there can be a single software platform or more than two software platforms that are all connected to a single independent services platform 110.

The system 100 can store packaged services 145 received from service developers 144 in a services collection 180. The services collection 180 can be populated by service operators, the service developers 144, or some combination of these. As described above, a service in execution is a software subsystem that includes one or more service instances. Thus, each of the packaged services 145 includes at least source code, executable files, or both, and any required dependencies, for launching service instances that implement the service.

The system controller 140 can read the services collection 180 to obtain a list of all available services for use by computing tasks hosted by the software platforms 120 and 130 of the system 100. The system controller 140 can then provide a services marketplace user interface 147 to application developers 142. The services marketplace user interface 147 allows application developers 142 to select services to be launched via the independent services platform 110.

Upon receiving a selection of one or more services by an application developer 142, the system controller 140 uses the deployment manager 150 to provision resources in the underlying cloud computing infrastructure 170 to host the service instances to implement the selected services in the independent services platform 110.

Notably, selection of services and the provisioning of resources for the selected services can occur before any computing tasks have been launched in either of the software platforms 120 or 130. For example, the selected service can be a database management system. The system controller 140 can use the deployment manager 150 to provision 4 service instances to manage queries into the database management system. Because the services platform 110 is independent of any other software platforms, a software application that is not part of any software platform can make use of such services on the independent services platform 110. For example, an application developer can simply write a Python script that interacts with the database management system implemented by the service instances provisioned in the independent services platform 110.

Application developers 142 can also bind services in the independent services platform 110 to their computing tasks. For example, an application developer can provide a packaged computing task to the system controller 140. The system controller can then use the deployment manager 150 to provision resources for hosting multiple instances of the computing tasks 122 in the first software platform 120. The application developer 142 can then issue a command to the system controller 140 to bind the service to the computing tasks 122. As shown in FIG. 1, this allows the computing tasks 122 to consume the service by communicating with the service instances 112 provisioned in the independent services platform 110.

Similarly, application developers 142 can also bind services in the independent services platform 110 to computing tasks hosted by one or more other software platforms. An application developer can provide another computing task to the system controller 140 to be launched and maintained in the second software platform 130.

An application developer 142 can issue a command to the system controller 140 to bind a service in the independent services platform 110 to the computing tasks 132 hosted in the second software platform 130. As shown in FIG. 1, this allows the hosted computing tasks 132 to consume the service by communicating with the service instances 112 provisioned in the independent services platform 110.

There are a number of reasons why an application developer would want integrate the functionality of two different software platforms in this way. In general, it comes down to the system being able to provide the right tools for the different tasks at hand.

One example integration of two different software platforms with the independent services platform 110 is to use a cloud application platform with a container orchestration platform. An example of a container orchestration platform is Pivotal Container Service, which provides the functionality for launching Kubernetes clusters to run container workloads.

A cloud application platform is typically an environment designed for high-productivity software development. Therefore, much of the underlying configurations and dependencies are handled automatically, e.g., using frameworks and other integrated development tools, during staging and launching of the applications.

On the other hand, container orchestration platforms are better for hosting third-party, off-the-shelf software that may not have been written with development environment of the cloud application platform in mind. Thus, it is possible to adapt third-party, off-the-shelf software for use on a cloud application platform, doing so would typically require much more work and configuration that simply launching the software in one or more container workloads of a container cluster running an already compatible operating system.

And both of these types of software platforms can benefit from having easy access to the services that they need to run successfully.

An example of using all three platforms 110, 120, and 130 will now be described in the context of the first software platform 120 being a cloud application platform and the second software platform 130 being a container orchestration platform.

An application developer can provide to the system controller 140 a web application created by the application developer that implements a web site that maintains movie ratings. The movie ratings can be maintained by a database managed by a database management system that is produced by a service developer and that is implemented as a third-party service. A service instance of the database management system can be created directly in the independent services platform 110. The application developer can provide a request through the system controller 140 to bind the service instances to the platform application instances so that the platform application instances can communicate with the database management system when serving traffic from end users, e.g., an end user associated with end user device 160.

Additionally, the application developer can use the container orchestration platform 130 for using third-party off-the-shelf software to maintain usage and performance statistics of the database. To do so, the application developer can provide a provide a precompiled container workload to the system controller 140 that computes usage metrics for the database. The system controller 140 can launch one or more instances of the container workload in a container cluster of the container orchestration platform 130. The application developer can then provide a request through the system controller 140 to bind the service instances to the container cluster so that the container workloads can communicate with the database management system in order to maintain the usage metrics of the database.

This example described using the independent services platform 110 with both a cloud application platform and a container orchestration platform. However, an application developer can also use the independent services platform 110 with two different cloud application platforms. For example, the software that computes usage and performance metrics for the database system may be developed and maintained by another team of application developers of the same enterprise. The team that develops the metrics software can have their own cloud application platform for launching instances of platform applications that implement the software.

In that situation, the application developer can similarly launch the services instances in the independent services platform 110 and then bind the services instances to platform applications in both of the two different cloud application platforms. Similarly, the independent services platform can bind service instances to container workloads on separate container orchestration platforms.

The inversion of control provided by the independent services platform fundamentally transforms the user experience for application developers. For example, the above-mentioned sequence of events can be accomplished by an application developer issuing just a handful of commands, e.g., on the command line, to the system controller 140. The details of this process are described in more detail below with reference to FIG. 2.

Figure 2:
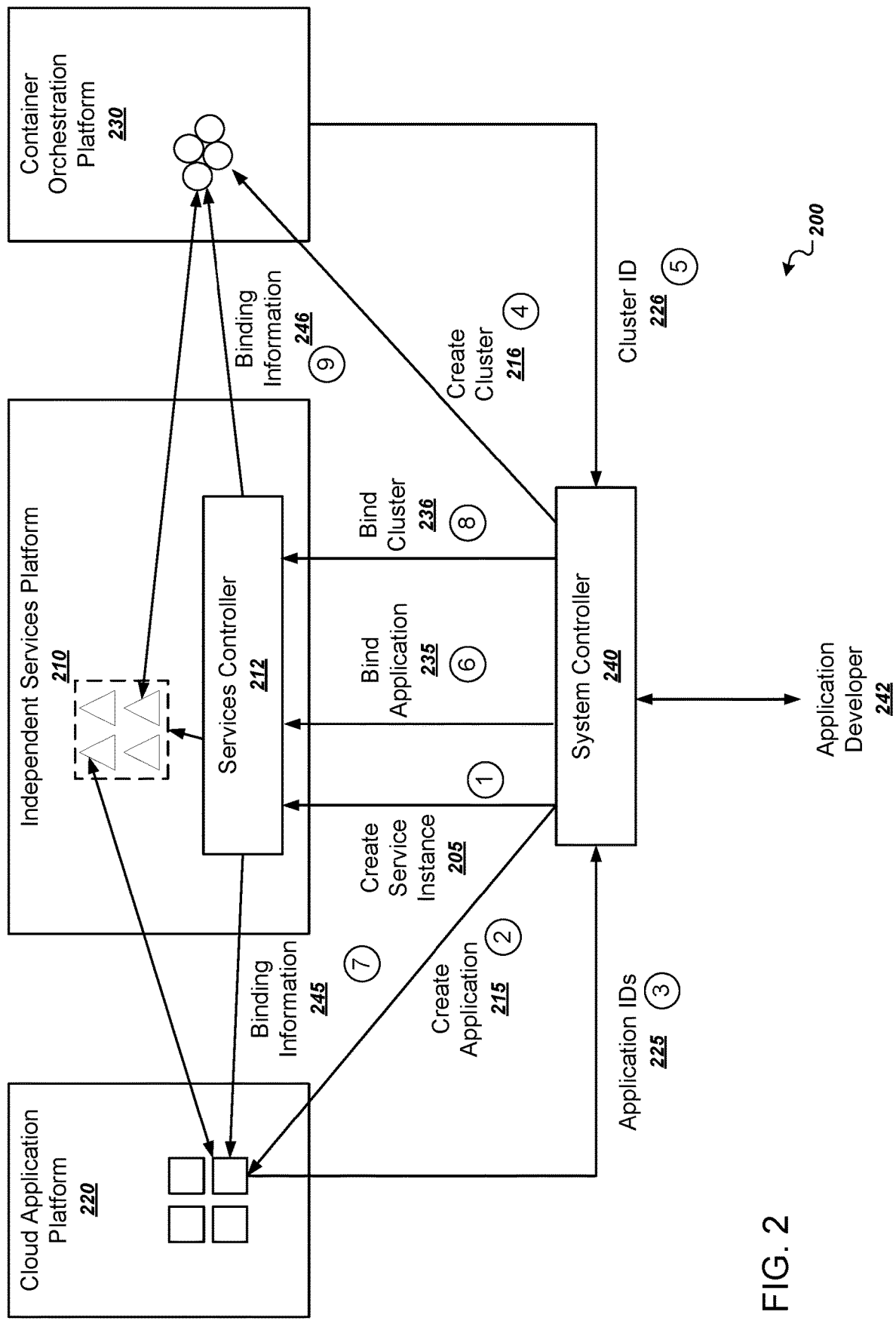
FIG. 2 is a diagram that illustrates the user commands and dataflow to bind service instances in an independent services platform.

FIG. 2 is a diagram that illustrates the user commands and dataflow to bind service instances in an independent services platform. FIG. 2 will be described in the context of an application developer 242 driving the process by issuing commands through a command-line interface that are received and interpreted by a system controller 240. The same techniques can also be used for any other appropriate type of user interface.

As shown in FIG. 2, an independent services platform 210 hosts service instances that can be used by two separate software platforms: a cloud application platform 220 and a container orchestration platform 230.

The application developer 242 can log on to the system 200, e.g., using a single sign-on interface. Single sign-on functionality can allow the application developer 242 to use one set of credentials in order to access and modify resources in any of the three platforms: the independent services platform 210, the cloud application platform 220, and the container orchestration platform 230. If there are multiple platforms in the system 200, system operators can first issue commands to the system controller 240 that register the cloud application platform 220 and the container orchestration platform 230 as platforms that the application developer 242 will be using. In this example, the cloud application platform 220 is named "cf1", and the container orchestration platform 230 is named "k8s1".

As described above, a system controller 240 can provide the application developer 242 with a services marketplace user interface that lists all services that are available to be launched in the independent services platform 210.

The application developer 242 can then select an available service by issuing a create service instance command to the system controller 240. In this example, the application developer 242 has chosen a service named "mysql" that provides the functionality of a database management system. The application developer 242 can thus issue the following example command through the command-line interface:

$> sc create instance mysql --name shared-db

This example command identifies a named service, "mysql," and also assigns a name to the services instances, which in this case is "shared-db". The name of the service instances can be used later on to bind the launched service instances to computing tasks in other software platforms.

In response, the system controller 240 can send a create service instance command 205 to a services controller 212 of the independent services platform 210. In some implementations, the first term of the command-line command names a platform controller that will implement the command. This example, the "sc" term names the services controller 212, and thus the rest of the command can be implemented by the services controller. The system controller 240 can thus either interpret the command-line text send an appropriate instruction to the services controller 212, or the system controller 240 can merely send along the remainder of the command to the appropriate platform controller.

The services controller 212 can then use a service broker for the service to launch the service instances in the independent services platform 210 to implement the selected service. Notably, at this point no tasks, e.g., applications or container workloads, have been launched in either of the other two platforms 220 and 230. Rather, the independent services platform 210 allows the mysql database to run independently of and regardless of the existence of any other software platforms.

The application developer 242 can then issue command line commands to launch instances of an application and a container workload in the cloud application platform 220 and the container orchestration platform 230 respectively. For example, the application developer 242 can issue the following example commands:

```
$> ac create instance myapplication
$> cc create cluster prometrics
```

The first command includes a term "ac" that indicates that an application controller of the cloud application platform 220 will handle implementation of the command. In this example, the first command references an application named "myapplication" that was developed by the application developer 242 for the cloud application platform 220. After launching one or more instances of the application, the cloud application platform 220 can return one or more application ids 225 back to the system controller 240 for display to the application developer 242.

The second command includes a term "cc" that indicates that a cluster controller of the container orchestration platform 230 will handle implementation of the command. In this example, the second command references a container workload that is a third-party off-the-shelf metrics suite named "prometrics."

The application developer 242 can issue two additional command line arguments to bind the service instances that are already launched in the independent services platform 210 to the platform applications in the cloud application platform 220 as well as to the container clusters in the container orchestration platform 230. For example, the application developer can issue the following example commands:

```
$> sc create binding --instance shared-db --platform
   cf1 myapplication
$> sc create binding --instance shared-db --platform
   k8s1 prometrics
```

The first bind command lists the services controller 212 as the appropriate handler and references the service instances named "shared-db". The first bind command also names a platform with the "--platform" flag as well as the application, "myapplication", that should be bound the service instances.

Upon receiving this first bind command, the services controller 212 makes a call into the cloud application platform 220 to provide binding information 245. The binding information 245 is information, e.g., locations and credentials, that allow the instances of the "myapplication" application to use the service in the independent services platform 210.

Similarly, the second bind command lists the services controller 212 as the appropriate handler and references the service instances named "shared-db". The second bind command also names a platform with the "--platform" flag as well as the container workload, "prometrics", that should be bound to the service instances.

Upon receiving this second bind command, the services controller 212 makes a call into the container orchestration platform 230 to provide binding information 246, which, as described above, is information that allows the container workloads running "prometrics" to use the service in the independent services platform 210.

As this example illustrates, with an independent services platform the user can bind the shared database to software tasks in multiple different heterogeneous platforms using only 5 command-line interface commands.

In addition, each of the two bind commands is notably handled by the services controller of the independent services platform 210 without going through any of the other software platforms. This system design essentially reverses the location of the control plane for creating and binding these resources. In other words, the independent services platform 210 provides a single place to control visibility and permissions relating to which services are available to which platforms, which services are available to which users, or both. For example, the services controller 212 can maintain a mapping between platforms and services that are permitted to be used each of the platforms. Thus, for example, developers using the cloud application platform 220 might see a different set of services than developers using the container orchestration platform 230.

The design also solves the aforementioned drawbacks of integrated services on software platforms.

First, the services platform being independent of any of the other platforms solves the problem of duplicated service installs. In other words, the independent services platform that maintain a single collection of services that are available for use by any software platforms in the system without having duplicated installations. For example, if different teams within an enterprise have different cloud application platforms, both cloud application platforms can simply bind to service instances in the independent services platform rather than having to re-install all maintained services for each of the cloud application platforms.

Similarly, the container orchestration platforms need not maintain a separate services marketplace for every cluster of container workloads. Instead, all container orchestration platforms can simply bind to service instances in the independent services platform.

In addition, the different types of platforms can bind to the same service instances in the independent services platform without anyone needing to decide which platform owns the service instances or on which platform the service instances will be launched and maintained.

Lastly, the single location for launching and maintaining service instances provides for powerful monitoring capabilities by platform operators, service operators, and possibly also service developers. An example of such techniques is described below with reference to FIG. 4.

Figure 3:
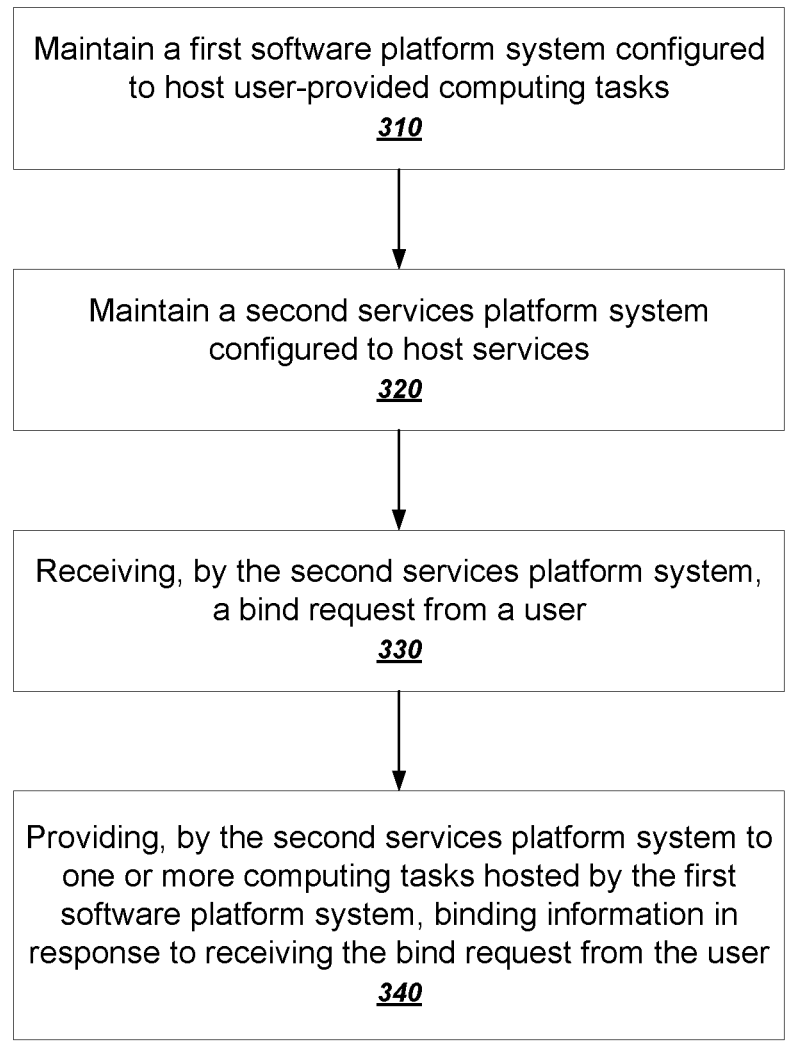
FIG. 3 is a flowchart of an example process for providing an independent services platform.

FIG. 3 is a flowchart of an example process for providing an independent services platform. For convenience, the process will be described as being performed by a distributed system having a plurality of computers in an underlying cloud computing system and programmed appropriately in accordance with this specification. For example, the system 100 of FIG. 1, appropriately programmed can perform the example process.

The system maintains a first software platform system configured to host user-provided computing tasks (310). As described above, the first software platform system can be a cloud application platform that launches instances of platform applications, a container orchestration platform that launches clusters of container workloads, or another appropriate software platform system.

The system maintains a second services platform system configured to host services (320). As described above the second services platform system can be independent of the first software platform system in the sense that service instances can be launched on the services platform system without requiring the existence of or the intervention of the first software platform system. The resources provisioned for the second services platform system can also have hardware isolation from resources provisioned for the first software platform system. In other words, the second services platform system does not compete for hardware computing resources with any provisioned resources of the first software platform system.

The system receives, by the second services platform system, a bind request from a user (330). As described above, the user in this context is typically an application developer or a platform operator. The bind request can specify by an identifier, e.g., a name or unique id, of both a computing task on the first software platform system and an identifier of a service or a service instance in the second services platform system.

The system provides, by the second services platform system to one or more computing tasks hosted by the first software platform system, binding information in response to receiving the bind request from the user (340). As described above, the services platform calling into the software platform to providing binding information represents an inversion of control relative to conventional integrated platform services.

As described above, the second services platform system can receive multiple bind requests in order to bind a service launched on the platform to computing tasks on multiple, possibly heterogeneous computing platforms. For example, the first software platform system can be a cloud application platform, and another software platform system can be a container orchestration platform. As another example, both platforms can be separate cloud application platforms or separate container orchestration clusters or platforms.

Figure 4:
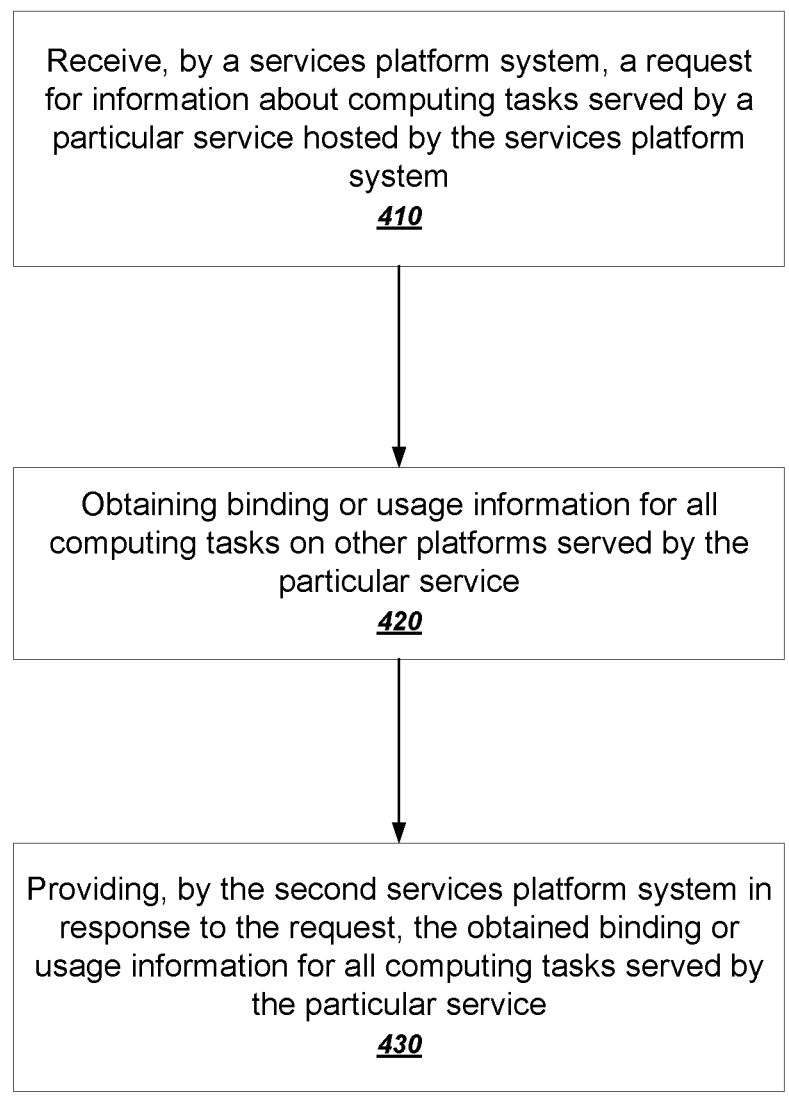
FIG. 4 is a flowchart of an example process for monitoring services on an independent services platform.

FIG. 4 is a flowchart of an example process for monitoring services on an independent services platform. For convenience, the process will be described as being performed by a distributed system having a plurality of computers in an underlying cloud computing system and programmed appropriately in accordance with this specification. For example, the system 100 of FIG. 1, appropriately programmed can perform the example process.

The system receives, by a services platform system, a request for information about computing tasks served by a particular service hosted by the services platform system (410). The user providing the request can be a service operator responsible for maintaining all or a portion of the services platform system. Alternatively or in addition, the user providing the request can be a platform operator responsible for maintaining all or a portion of a software platform system that consumes services on the services platform system. Optionally, the user providing the request can be a service developer who provided the service.

The system obtains binding or usage information for all computing tasks on other platforms served by the particular service (420). Because the service instances that implement the service are maintained in a single independent services platform system rather than being maintained across multiple different platform systems, the binding and usage information can be efficiently retrieved. In particular, the independent services platform allows a single place to know how many service instances and bindings have been created, and when, and for which computing tasks. The independent services platform also provides a single place to get more in depth information from services, e.g., metrics.

The system can for example maintain a mapping between each service and software tasks on other platforms that have issued bind requests for the service or usage metrics for software tasks that use the service. Then, upon receiving the request, the system can read the mapping to obtain the binding and usage information.

The system provides, by the second services platform system in response to the request, the obtained binding or usage information for all computing tasks on other platforms served by the particular service (430). The system can present the binding or usage information in any appropriate user interface. In some implementations, if the user does not have permissions to view project information for services on other platforms, the system can filter or redact such binding and usage information before providing it to the requesting user.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments described above, the following embodiments are also innovative:

Embodiment 1 is a method comprising:
maintaining a first software platform system configured to host user-provided computing tasks in a cloud computing environment of a distributed computing system comprising a plurality of computers, wherein the first software platform system is configured to receive a computing task, provision computing resources in an underlying cloud computing infrastructure, and launch one or more instances of the computing task using the provisioned computing resources in the underlying cloud computing infrastructure; and
maintaining a second services platform system configured to host services in the cloud computing environment of the distributed computing system, wherein the second services platform system is configured to provision independent service resources in the underlying cloud computing infrastructure, and launch one or more service instances of the service using the provisioned independent service resources in the underlying cloud computing infrastructure,
wherein the second services platform system is configured to receive a bind request from a user and to provide, by the second services platform system, binding information to one or more computing tasks hosted by the first software platform system upon receiving the bind request.

Embodiment 2 is the method of embodiment 1, wherein the second services platform system is independent of the first software platform system.

Embodiment 3 is the method of embodiment 2, wherein service instances in the second services platform system can be launched with or without the first software platform system.

Embodiment 4 is the method of embodiment 2, wherein service instances in the second services platform system have hardware isolation from provisioned resources for computing tasks in the first software platform system.

Embodiment 5 is the method of embodiment claim 2, wherein maintaining the second services platform system comprises launching service instances in the second services platform system before launching any computing tasks in the first software platform system.

Embodiment 6 is the method of any one of embodiments 1-5, wherein the first software platform system is a container orchestration platform configured to host container workloads in a first container cluster.

Embodiment 7 is the method of embodiment 6, wherein the second services platform is configured to bind a single service to both container workloads in the first container cluster and container workloads in a separate second container cluster hosted by the container orchestration platform.

Embodiment 8 is the method of any one of embodiments 1-7, wherein the first software platform system is a cloud application platform configured to host developer-supplied applications.

Embodiment 9 is the method of embodiment 8, further comprising:
maintaining a container orchestration platform that is separate from the cloud application platform, wherein the container orchestration platform is configured to host container workloads in a container cluster,
wherein the second services platform system is configured to bind a single service to both applications hosted by the cloud application platform and container workloads hosted by the container orchestration platform.

Embodiment 10 is the method of embodiment 9, further comprising:
launching, by the second services platform system, one or more service instances for a particular service;
receiving, by the second services platform system, a first bind request to bind the particular service to a platform application hosted by the cloud application platform;
in response, providing, by the second services platform system, first binding information to the platform application hosted by the cloud application platform;
receiving, by the second services platform system, a second bind request to bind the particular service to a container workload hosted by the container orchestration platform; and
in response, providing, by the second services platform system, second binding information to the container workload hosted by the container orchestration platform.

Embodiment 11 is the method of embodiment 10, wherein providing the first binding information to the platform application hosted by the cloud application platform and providing the second binding information to the container workload hosted by the container orchestration platform causes the platform application hosted by the cloud application platform and the container workload hosted by the container orchestration platform to use the same service instances provisioned in the second services platform system.

Embodiment 12 is the method of embodiment 8, further comprising:
maintaining a separate second cloud application platform, wherein the second services platform system is configured to bind a single service to both applications hosted by the cloud application platform and applications hosted by the separate second cloud application platform.

Embodiment 13 is the method of any one of embodiments 1-12, wherein the second services platform system is configure to bind a service to a software application that is not hosted by the first software platform system.

Embodiment 14 is a system comprising: a plurality of computers and one or more storage devices storing instructions that are operable, when executed by the one or more computers, to cause the one or more computers to perform the method of any one of embodiments 1-13.

Embodiment 15 is a computer storage medium encoded with a computer program, the program comprising instructions that are operable, when executed by a plurality of computers, to cause the plurality of computers to perform the method of any one of embodiments 1-13.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A distributed computing system comprising a plurality of computers and one or more storage devices storing instructions that are operable, when executed by the plurality of computers, to cause the plurality of computers perform operations comprising:
maintaining a first software platform system configured to host user-provided computing tasks in a cloud computing environment of the distributed computing system, wherein the first software platform system is configured to receive a computing task, provision computing resources in an underlying cloud computing infrastructure, and launch one or more instances of the computing task using the provisioned computing resources in the underlying cloud computing infrastructure; and
maintaining a different second services platform system configured to host services in the cloud computing environment of the distributed computing system for multiple different software platform systems including the first software platform system, wherein the different second services platform system is configured to provision independent service resources in the underlying cloud computing infrastructure, and to launch one or more service instances of a service using the provisioned independent service resources in the underlying cloud computing infrastructure,
wherein the different second services platform system is configured (i) to receive a first bind request from a first user device and a second bind request from a second user device and (ii) to provide, by the different second services platform system, binding information to one or more first computing tasks hosted by the first software platform system in response to receiving the first bind request and provide binding information to one or more second computing tasks hosted by another platform from the multiple different software platform systems in response to receiving the second bind request.

2. The system of claim 1, wherein the different second services platform system is independent of the first software platform system.

3. The system of claim 2, wherein service instances in the different second services platform system can be launched with or without the first software platform system.

4. The system of claim 2, wherein service instances in the different second services platform system have hardware isolation from provisioned resources for computing tasks in the first software platform system.

5. The system of claim 2, wherein maintaining the different second services platform system comprises launching service instances in the different second services platform system before launching any computing tasks in the first software platform system that will consume one of the service instances.

6. The system of claim 1, wherein the first software platform system is a container orchestration platform configured to host container workloads in a first container cluster.

7. The system of claim 6, wherein the different second services platform system is configured to bind a single service to both container workloads in the first container cluster and container workloads in a separate second container cluster hosted by the container orchestration platform.

8. The system of claim 1, wherein the first software platform system is a cloud application platform configured to host developer-supplied applications.

9. The system of claim 8, wherein the operations further comprise:

maintaining a container orchestration platform that is separate from the cloud application platform, wherein the container orchestration platform is configured to host container workloads in a container cluster, wherein the different second services platform system is configured to bind a single service to both applications hosted by the cloud application platform and container workloads hosted by the container orchestration platform.

10. The system of claim 9, wherein the operations further comprise:

launching, by the different second services platform system, one or more service instances for a particular service;

receiving, by the different second services platform system, a first bind request to bind the particular service to a platform application hosted by the cloud application platform;

in response, providing, by the different second services platform system, first binding information to the platform application hosted by the cloud application platform;

receiving, by the different second services platform system, a second bind request to bind the particular service to a container workload hosted by the container orchestration platform; and in response, providing, by the different second services platform system, second binding information to the container workload hosted by the container orchestration platform.

11. The system of claim 10, wherein providing the first binding information to the platform application hosted by the cloud application platform and providing the second binding information to the container workload hosted by the container orchestration platform causes the platform application hosted by the cloud application platform and the container workload hosted by the container orchestration platform to use the same service instances provisioned in the different second services platform system.

12. The system of claim 8, wherein the operations further comprise:

maintaining a separate second cloud application platform, wherein the different second services platform system is configured to bind a single service to both applications hosted by the cloud application platform and applications hosted by the separate second cloud application platform.

13. The system of claim 1, wherein the different second services platform system is configure to bind a service to a software application that is not hosted by the first software platform system.

14. A method performed by a distributed computing system comprising a plurality of computers, the method comprising:

maintaining a first software platform system configured to host user-provided computing tasks in a cloud computing environment of the distributed computing system, wherein the first software platform system is configured to receive a computing task, provision computing resources in an underlying cloud computing infrastructure, and launch one or more instances of the computing task using the provisioned computing resources in the underlying cloud computing infrastructure; and maintaining a different second services platform system configured to host services in the cloud computing environment of the distributed computing system for multiple different software platform systems including the first software platform system, wherein the different second services platform system is configured to provision independent service resources in the underlying cloud computing infrastructure, and to launch one or more service instances of a service using the provisioned independent service resources in the underlying cloud computing infrastructure, wherein the different second services platform system is configured (i) to receive a first bind request from a first user device and a second bind request from a second user device and (ii) to provide, by the different second services platform system, binding information to one or more first computing tasks hosted by the first software platform system in response to receiving the first bind request and provide binding information to one or more second computing tasks hosted by another platform from the multiple different software platform systems in response to receiving the second bind request.

15. The method of claim 14, wherein the different second services platform system is independent of the first software platform system.

16. The method of claim 14, wherein maintaining the different second services platform system comprises launching service instances in the different second services platform system before launching any computing tasks in the first software platform system.

17. The method of claim 14, wherein the first software platform system is a container orchestration platform configured to host container workloads in a first container cluster.

18. The method of claim 14, wherein the first software platform system is a cloud application platform configured to host developer-supplied applications.

19. The method of claim 18, further comprising:

maintaining a container orchestration platform that is separate from the cloud application platform, wherein the container orchestration platform is configured to host container workloads in a container cluster, wherein the different second services platform system is configured to bind a single service to both applications hosted by the cloud application platform and container workloads hosted by the container orchestration platform.

20. The method of claim 19, further comprising:

launching, by the different second services platform system, one or more service instances for a particular service;

receiving, by the different second services platform system, a first bind request to bind the particular service to a platform application hosted by the cloud application platform;

in response, providing, by the different second services platform system, first binding information to the platform application hosted by the cloud application platform;

receiving, by the different second services platform system, a second bind request to bind the particular service to a container workload hosted by the container orchestration platform; and in response, providing, by the different second services platform system, second binding information to the container workload hosted by the container orchestration platform.

21. The method of claim 20, wherein providing the first binding information to the platform application hosted by the cloud application platform and providing the second binding information to the container workload hosted by the container orchestration platform causes the platform application hosted by the cloud application platform and the container workload hosted by the container orchestration platform to use the same service instances provisioned in the different second services platform system.

22. One or more non-transitory computer storage media encoded with computer program instructions that when executed by a distributed computing system comprising a plurality of computers cause the plurality of computers to perform operations comprising:

maintaining a first software platform system configured to host user-provided computing tasks in a cloud computing environment of the distributed computing system, wherein the first software platform system is configured to receive a computing task, provision computing resources in an underlying cloud computing infrastructure, and launch one or more instances of the computing task using the provisioned computing resources in the underlying cloud computing infrastructure; and maintaining a different second services platform system configured to host services in the cloud computing environment of the distributed computing system for multiple different software platform systems including the first software platform system, wherein the different second services platform system is configured to provision independent service resources in the underlying cloud computing infrastructure, and to launch one or more service instances of a service using the provisioned independent service resources in the underlying cloud computing infrastructure, wherein the different second services platform system is configured (i) to receive a first bind request from a first user device and a second bind request from a second user device and (ii) to provide, by the different second services platform system, binding information to one or more first computing tasks hosted by the first software platform system in response to receiving the first bind request and provide binding information to one or more second computing tasks hosted by another platform from the multiple different software platform systems in response to receiving the second bind request.

* * * * *